United States Patent Office 3,595,781
Patented July 27, 1971

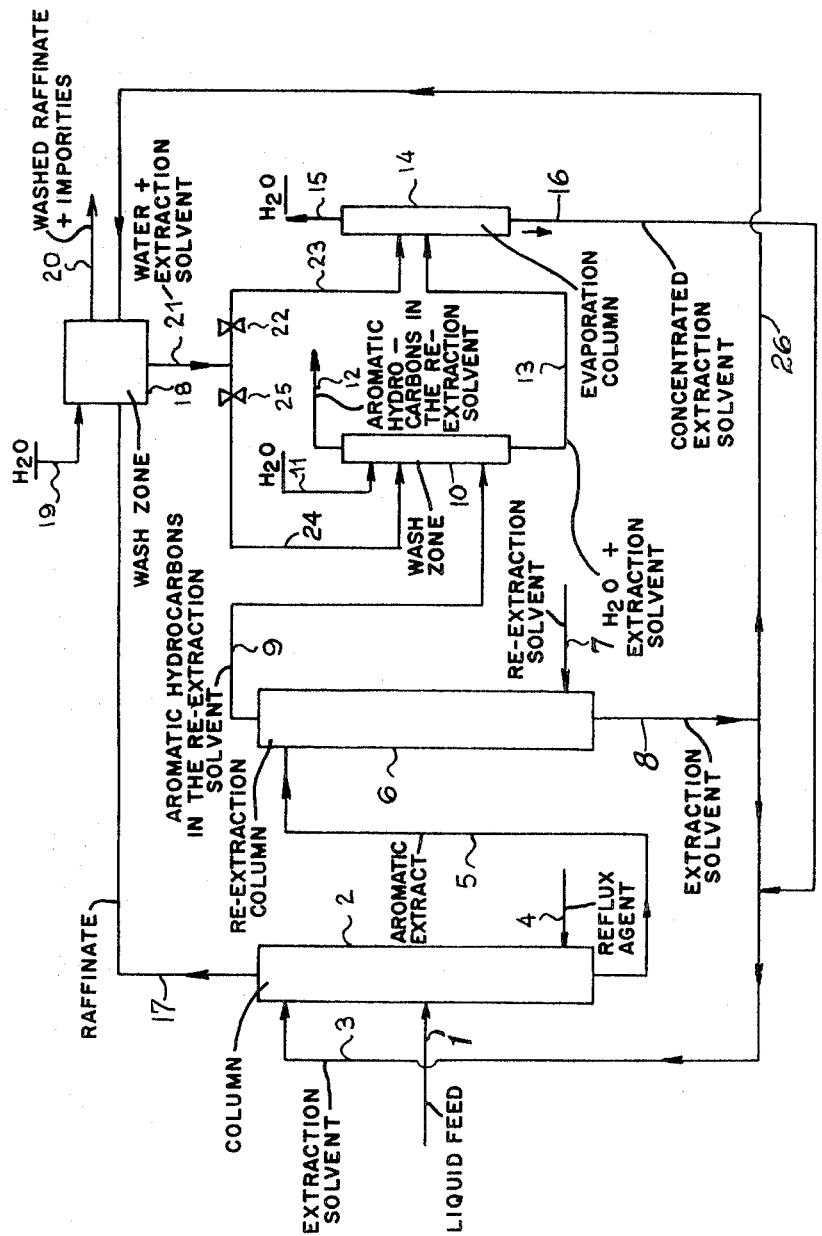

3,595,781
SOLVENT EXTRACTION OF AROMATIC
HYDROCARBONS
Francois Pierre Navarre, Paris, André Molines, Moureux-Neuf, and Claude Raimbault, Sevres, France, assignors to Institut Francais du Petrole, des Carburants et Lubrifiants, Rueil Malmaison, Hauts-de-Seine, France
Filed Dec. 3, 1968, Ser. No. 780,623
Claims priority, application France, Dec. 6, 1967, 131,258
Int. Cl. C10g 21/28
U.S. Cl. 208—321    14 Claims

ABSTRACT OF THE DISCLOSURE

A process for purifying at least a portion of a recycled extraction solvent recovered, from the extract, in the solvent extraction of aromatic hydrocarbons from a liquid and mixture of said aromatic hydrocarbons and a raffinate which comprises contacting said portion of the extraction solvent with the raffinate in the presence of additional water so that the ratio of the total water to recycle extraction solvent present in about 0.7 part by weight of water to about 100 parts by weight of recycle extraction solvent.

---

This invention relates to an improvement in the solvent extraction of aromatic hydrocarbons.

The extraction by solvent of aromatic hydrocarbons from mixtures of the same with more saturated hydrocarbons is a well-known operation which is broadly used on the industrial scale.

It consists essentially of contacting the hydrocarbon mixture with a selective solvent which is not miscible in any proportion with the said mixture. By decantation of the two resulting phases, there is recovered an extract consisting of a solution of hydrocarbons in the solvent, said solution being enriched in aromatic hydrocarbons, and a raffinate consisting of hydrocarbons which have been impoverished in aromatic hydrocarbons, said raffinate usually containing a minor fraction of the used solvent.

The raffinite is usually washed with water in order to remove the solvent therefrom.

To fractionate the extract, several means may be employed, particularly distillation, re-extraction and the like. A particularly advantageous process is described, for example, in the Belgian Pat. No. 658,469 filed on the Jan. 18, 1965.

Irrespective of the fractionation means, there is recovered a concentrate of aromatic hydrocarbons, on the one hand, and the solvent, which may be recycled, on the other hand.

However it may be observed that the solvent grows darker and darker, which is attributable to the formation of decomposition products. The solvent also may lose in part its selectivity. This change appears to be attributable to the accumulation of impurities which finally soil and colour the aromatic hydrocarbons.

To remedy these inconveniences, it has already been proposed to collect and purify by distillation one part of the recycled solvent.

However this step is costly and of little efficiency since the most detrimental impurities probably distill in admixture with the solvent.

It is also conventional to dilute the solvent with water before recycling, this having for object to remove the aromatic hydrocarbons therefrom. This step also is not satisfactory: since water and the solvent are miscible, it is thereafter necessary to distill water as top product and to recover the solvent together with impurities as bottom product, the said solvent being recycled: this process does not substantially purify the solvent.

This invention relates to a new and costless purification process for the recycled solvent.

This process consists essentially of withdrawing a part of the extraction solvent to be recycled and contacting the latter with the raffinate essentially in the liquid state, in the presence of water used in an amount as stated hereinafter. This results in an efficient discolouration and purification of the solvent, the impurities preferentially dissolving in the raffinate due to the particularly high affinity of the solvent for water.

By raffinate essentially in the liquid state, there is meant a composition at least 95% by volume of which is in the liquid state when contacted according to this invention with the solvent and water.

The amount of additional water must be such that the solvent be usable to dissolve a substantial amount of saturated hydrocarbons of the raffinate. It must however be sufficient to release the impurities of the solvent.

It has been found that the proportion of water dissolved in the organic solvent when contacted with the raffinate had to be selected between 0.7 and 100 and preferably between 1 and 50 parts by weight of water per part by weight of organic solvent.

This water may be used in various manners. It may be admixed, for example, with the fraction of recycled extraction solvent before the latter is contacted with the raffinate; another preferred method consists of admixing the raffinate with the extraction solvent to be recycled and water in situ, this water quickly dissolving in the solvent and releasing the impurities which go into the raffinate. The process of this invention is not limited to any of these methods.

An analysis of this fraction of solvent, before and after contact with the raffinate and water, shows that this fraction of solvent has been purified during the contact. Usually a mere visual inspection shows that the coloured impurities have been removed in major part if not completely.

It is essential that the contact take place simultaneously between the 3 types of products in liquid phase: fraction of the solvent to be recycled, raffinate and water. A mixture of these elements two by two followed or not, after separation, by an admixing with the third one is unable to provide for the desired purification.

It will be pointed out that in this definition of the process as well as in the following, there is meant by "organic solvent" the solvent in a practically pure state, for example dimethylsulfoxide of 100% purity.

Conversely by "extraction solvent" there is meant the solvent which is really introduced in the extraction zone, i.e. either the organic solvent alone or a mixture of the same with water and, in some cases, with impurities. The extraction solvent, as well as the recycled solvent, usually comprises from 0 to 0.4 part of water per part by weight of organic solvent.

This operation is of low cost since, contrarily to prior processes, it avoids the use of heat necessary for distilling the extraction solvent to be recycled and the plant therefor. Moreover the contact between the raffinate, the fraction of extraction solvent and water requires only the use of a washing zone for the raffinate which is slightly larger than that normally used in a conventional extraction plant.

It is indeed of interest to carry out the contact between the raffinate and the solvent fraction to be purified in that unit where there is carried out the water-washing of the raffinate. The washing water is then used as dilution water for the solvent. In that case, the mixture of the 3 compounds (raffinate+fraction of extraction solvent+water) is carried out in situ. These 2 zones could be separated; however this would result in a more complex plant without particular technical advantage.

The purified extraction solvent may be recycled directly to the aromatic hydrocarbons extraction stage; however since it is diluted with too large an amount of water, it is preferable to concentrate it by evaporation of the water excess contained therein, either directly or after using as a solvent for washing the aromatic re-extract or the aromatic concentrate. Practically, although the purification may be carried out periodically, it is preferred to operate continuously. The amount of solvent to be withdrawn from the main flow of recycled solvent is selected according to the desired result.

Usually this amount is 0.001 to 0.5 times and preferably 0.005 to 0.05 times the total amount of recycled solvent.

The accompanying drawing shows various embodiments of the invention given by way of examples. Although this relates to a unit where the aromatic hydrocarbons are re-extracted by means of a second solvent, it is clear that the process may also be carried out in a unit comprising a distillation plant to separate the aromatic hydrocarbons from the main solvent.

On this drawing the liquid feed containing, for example, a mixture of saturated and aromatic hydrocarbons is introduced through pipe 1 into the liquid-liquid extraction column 2 of the counter-current type. The extraction solvent, preferably a mixture of dimethylsulfoxide with water, is introduced through pipe 3. A reflux agent of a known type may be introduced through pipe 4, for example a lower paraffinic hydrocarbon such as propane, butane, pentane, a part of the aromatic extract or a mixture thereof. This results into an aromatic extract which is passed through pipe 5 into the re-extraction column 6. The re-extraction solvent, for example liquefied butane, is passed through line 7. The liberated extraction solvent is passed through line 8 to line 3. In line 9 there is recovered a solution of aromatic hydrocarbons in the re-extraction solvent, these hydrocarbons being washed in zone 10 to separate the extraction solvent which could have been carried away, water being introduced from line 11. The solution of aromatic hydrocarbons in the re-extraction solvent, which has been made free from extraction solvent, is separated through line 12. The mixture of water and extraction solvent is conveyed through pipe 13 to the evaporation unit 14. Water is withdrawn through line 15 whereas the concentrated extraction solvent is recycled through pipe 16 to pipe 3.

The raffinate which comprises essentially saturated hydrocarbons and extraction solvent, is passed through line 17 to the washing zone 18. Water is introduced from line 19. The washed raffinate is withdrawn through line 20, whereas water and the extraction solvent are removed through pipe 21.

This water is then treated to recover the extraction solvent. It may be either subjected to an independent distillation or to a distillation in admixture with that water which has been used for washing the extract. This latter embodiment is obviously more advantageous. It consists of passing water from the washing of the raffinate through valve 22 into pipe 23 opening in unit 14. A more preferred embodiment comprises passing said water through pipe 24 and valve 25 to the unit 10 where the aromatic hydrocarbons are washed. In that case the amount of water from pipe 11 may be strongly reduced.

Irrespective of the embodiment used, the extraction solvent grows darker and darker and impurities accumulate. This inconvenience remains if a part of the extraction solvent is distilled, for example by passing a part of the solvent of pipe 8 directly to the distillation unit 14.

According to the improved process of this invention, a portion of the extraction solvent of pipe 8 is passed to the washing unit 18 through pipe 26. The previous inconveniences are no longer observed since the impurities are removed in the raffinate of line 20.

The portion of solvent of line 16 which has been purified is recycled to the extraction column 2 in which it is admitted either in admixture with the not-purified solvent fraction (as shown in the drawing) or separately. In the latter case it is preferred to introduce the purified solvent at a higher level than the not-purified solvent.

This new purification process may be applied to all of the organic solvents which exhibit a high affinity for water, i.e. to those which are able to dissolve at least 50% of their weight of water at the treatment temperature, and preferably those which are miscible with water in any proportion at that temperature. By way of examples the following are mentioned: dimethylsulfoxide, ethylene glycol, sulfolane, methyl carbamate and N-methyl pyrrolidone. Dimethylsulfoxide is however preferred.

For extracting aromatic hydrocarbons, these solvents are usually employed in admixture with water; the ratio by weight water/organic solvent is usually between 0 and 0.4 part of water per part of solvent.

The following, non-limitative examples illustrative this invention:

EXAMPLE 1

There is used the plant described in the accompanying drawing, where valve 25 is open and valve 22 closed.

The hydrocarbon feed is a gasoline having the following composition by weight:

| | Percent |
|---|---|
| Saturated hydrocarbons | 20 |
| Olefinic hydrocarbons | 10.5 |
| Aromatic hydrocarbons | 69.5 |

This is counter-currently contacted with an extraction solvent consisting of 95% by weight of dimethylsulfoxide and 5% of water. The gasoline feeding rate is 100 kg. per hour, that of the extraction solvent 400 kg. per hour.

The extract is washed with 20 kg. per hour of butane introduced through line 4 (this butane is withdrawn in admixture with the raffinate) at the bottom of the extraction column, then it is re-extracted in column 6 by 160 kg./hour of butane introduced through line 7. The resulting re-extract is washed with water from line 11 as well as with the water issued from the washing of the raffinate through line 24, then butane is distilled, condensed and recycled to the re-extraction. There results a concentrate of aromatic hydrocarbons (69.2 parts by weight per hour).

The raffinate admixed with the butane from line 4 and which carries along 0.3 kg./hour of dimethylsulfoxide is withdrawn through line 17 and washed in unit 18 by means of 5.3 kg./hour of water from line 19 and 4 kg./hour of extraction solvent (95% dimethylsulfoxide and 5% water) from line 26. The ratio by weight water/dimethylsulfoxide in the washing zone 18 is 1.35.

The washing water is withdrawn through lines 21 and 24 as shown herebefore.

Under these conditions, the extraction solvent of line 3 remains clear and practically free from impurities.

EXAMPLE 2

Valve 25 is closed whereas valve 22 is open.

The extraction solvent remains clear and free from impurities.

EXAMPLE 3

This example is given by way of comparison but forms no part of this invention.

The 4 kg./hour of extraction solvent from line 26 are passed directly into the distillation unit 14, without passage through the washing unit 18; in that case, the extraction solvent of line 3 grows quickly dark.

EXAMPLE 4

After having processed as described in Example 3, the dark extraction solvent is passed anew to the washing unit 18 and no longer to the distillation unit 14.

The extraction solvent quickly recovers it pale colour.

EXAMPLE 5

Example 1 is repeated with the following modifications:

The feeding rate of water introduced through line 19 in the washing unit 18 is 20 kg. per hour. The feeding rate of the fraction of extraction solvent sent to the same unit is only 1.5 kg. per hour. Its composition remains unchanged (95% of dimethylsulfoxide and 5% of water).

In the washing unit 18, the ratio water/dimethylsulfoxide is 11.6 by weight. The extraction solvent remains clear and practically free from impurities as in Example 1.

EXAMPLE 6

This example is given by way of comparison but is not part of the invention.

Example 1 is repeated with liquid feeding rates through lines 19 and 26 corresponding to a ratio by weight water/dimethylsulfoxide of 0.4 in the washing unit 18.

All other conditions remaining unchanged, the same inconveniences as in Example 3 are observed.

What is claimed as this invention is:

1. In a process for extracting aromatic hydrocarbons from a liquid admixture of the same with more saturated hydrocarbons by means of an organic solvent in the liquid phase, wherein an extraction solvent containing from 0 to 0.4 part by weight of water in the dissolved state per part by weight of organic solvent is counter-currently contacted with the said liquid mixture in a main extraction zone, the extract of aromatic hydrocarbons in the said solvent being separated from a raffinate, and the extract being fractionated to a concentrate of aromatic hydrocarbons and the extraction solvent which is recycled to the main extraction zone, the improvement which comprises contacting at least a portion of the extraction solvent to be recycled with the raffinate, more than 95% by volume of said raffinate being in the liquid state, said contacting step being carried out in a secondary extraction zone in the presence of water used in such an amount that the ratio of water to recycle organic extraction solvent, by weight, is between 0.7 and 100, this portion of the extraction solvent being recycled to the main extraction zone after its contact with the raffinate.

2. A process according to claim 1, wherein the ratio, by weight, of water to recycle organic solvent in the secondary extraction zone is between 1 and 50.

3. A process according to claim 1, wherein the recycled portion of the extraction solvent which is contacted with the raffinate in the secondary extraction zone is about 0.001 to 0.5 times the total amount of recycled extraction solvent.

4. A process according to claim 3, wherein the recycled part of the extraction solvent which is contacted with the raffinate in the secondary extraction zone is about 0.005 to 0.05 times the total amount of recycled extraction solvent.

5. A process according to claim 1, wherein the fraction of purified extraction solvent removed from the secondary extraction zone together with the water is contacted with the aromatic hydrocarbons separated from the extract before being recycled to the main extraction zone.

6. A process according to claim 1, wherein the fraction of purified extraction solvent removed from the secondary extraction zone together with the water is concentrated by evaporation of the water excess contained therein before being recycled to the main extraction zone.

7. A process according to claim 1, wherein the fraction of the extraction solvent removed from the secondary extraction zone, together with the water, is contacted with the aromatic hydrocarbons separated from the extract and then concentrated by evaporation of the water excess contained therein before being recycled to the main extraction zone.

8. A process according to claim 1, wherein the extraction solvent in the main extraction zone contains 0.02 to 0.09 part by weight of water per part by weight of organic solvent.

9. A process according to claim 1, wherein the organic solvent is dimethylsulfoxide.

10. A process for purifying at least a portion of a recycled extraction solvent recovered from the extract in the solvent extraction of aromatic hydrocarbons from a liquid admixture of said aromatic hydrocarbons and a raffinate which comprises contacting said portion of the extraction solvent with the raffinate in the presence of additional water so that the ratio of the total water to recycle extraction solvent present is about 0.7 part by weight of water to about 100 parts by weight of recycle extraction solvent.

11. The process of claim 10, wherein the extraction solvent is an organic solvent which is able to dissolve at least about 50% of its weight of water at the treatment temperature.

12. The process of claim 11, wherein the organic solvent is selected from the group consisting of dimethylsulfoxide, ethylene glycol, sulfolane, methyl carbonate and N-methyl pyrrolidone.

13. The process of claim 10, wherein the raffinate comprises an admixture of olefinic hydrocarbons and saturated hydrocarbons.

14. The process of claim 10, wherein more than 95% by volume of the raffinate is in the liquid state.

References Cited

UNITED STATES PATENTS

| | | | |
|---|---|---|---|
| 2,176,396 | 10/1939 | Fenske et al. | 208—321 |
| 2,809,222 | 10/1957 | Hawkins et al. | 208—321 |
| 3,005,032 | 10/1961 | Makin | 208—322 |
| 3,205,167 | 9/1965 | Demeester | 208—321 |
| 3,249,532 | 5/1966 | Shiah | 208—321 |
| 3,476,681 | 11/1969 | Davies et al. | 208—321 |

HERBERT LEVINE, Primary Examiner

U.S. Cl. X.R.

208—314